(12) United States Patent
Taylor

(10) Patent No.: US 8,413,689 B1
(45) Date of Patent: Apr. 9, 2013

(54) STORM DRAINAGE CONDUIT PLUG WITH A SEALING BAND

(76) Inventor: James R. Taylor, St. Petersburg, FL (US)

(*) Notice: Subject to any disclaimer, the term of this patent is extended or adjusted under 35 U.S.C. 154(b) by 0 days.

(21) Appl. No.: 13/485,965

(22) Filed: Jun. 1, 2012

Related U.S. Application Data

(60) Provisional application No. 61/576,522, filed on Dec. 16, 2011.

(51) Int. Cl.
*F16L 55/10* (2006.01)
(52) U.S. Cl. ............ 138/89; 220/378; 220/320
(58) Field of Classification Search ......... 138/89; 215/355, 364; 220/789, 378, 801, DIG. 19
See application file for complete search history.

(56) References Cited

U.S. PATENT DOCUMENTS

| | | | |
|---|---|---|---|
| 1,747,591 A * | 2/1930 | Moore | 220/804 |
| 1,871,138 A * | 8/1932 | Ward, Jr. | 220/212.5 |
| 2,674,390 A * | 4/1954 | Meyer | 220/804 |
| 3,814,136 A * | 6/1974 | Johnson et al. | 138/89 |
| 4,342,419 A * | 8/1982 | Conway | 494/10 |
| 5,316,045 A | 5/1994 | Taylor | |
| 5,806,566 A | 9/1998 | Taylor | |
| 5,879,634 A * | 3/1999 | Ford | 422/527 |

* cited by examiner

*Primary Examiner* — Patrick F Brinson
(74) *Attorney, Agent, or Firm* — Thomas Frost

(57) ABSTRACT

The present invention relates to a storm drainage conduit plug for use with a sealing band for closing an exposed end of conduits during construction. The plug has a generally dome-shaped outer panel and an inner panel, with a handle for gripping disposed on the outer panel. There is a groove with an annular lip defined in a sealing surface of the inner panel. The plug is adaptable for a variety of sealing bands, and the lip prevents the band from disengaging from the plug during use. An inner wall of the inner panel has a slot defined therein that is aligned and dimensioned to engage with the handle of another plug for stacking for multiple plugs on-site during construction.

3 Claims, 4 Drawing Sheets

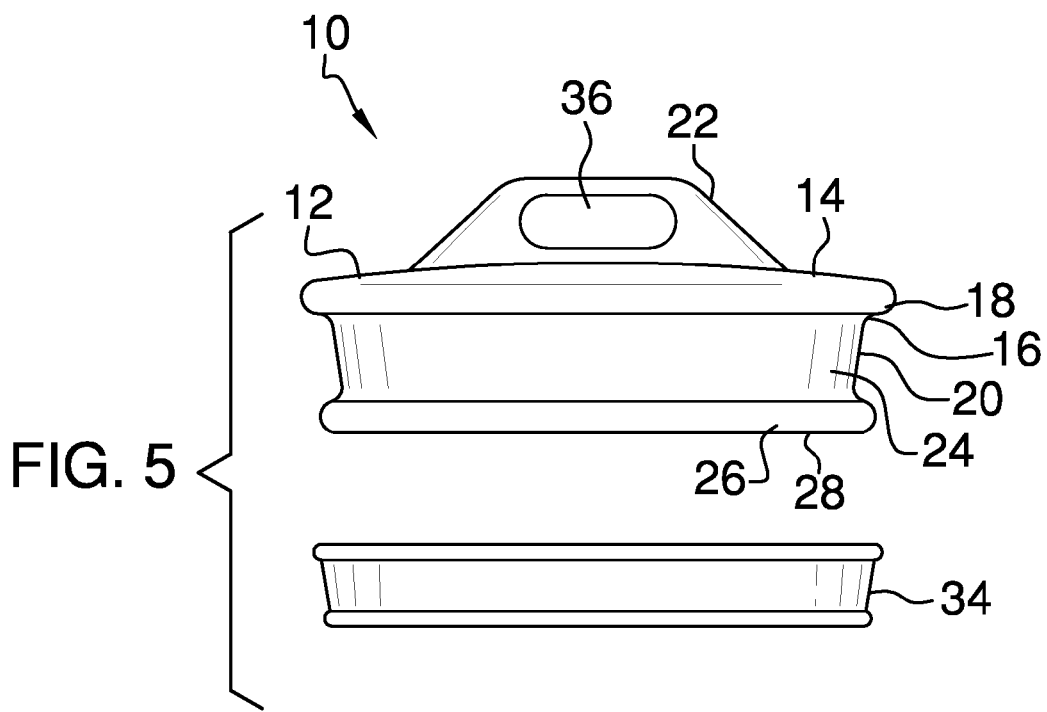
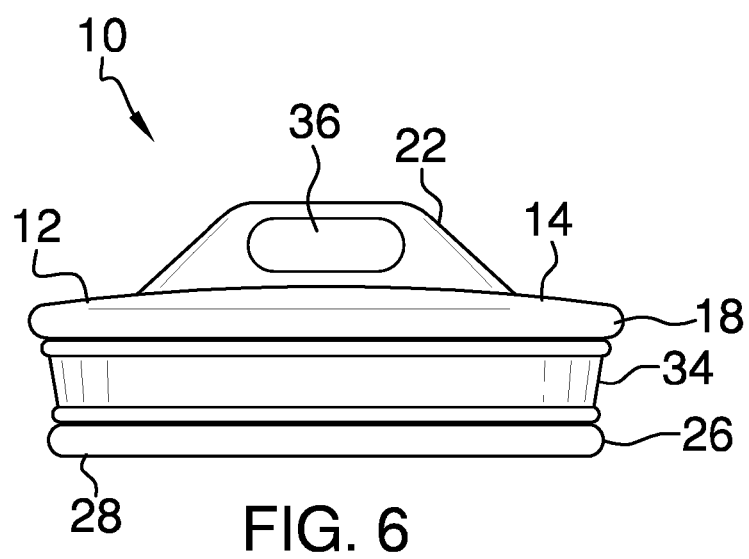

STORM DRAINAGE CONDUIT PLUG WITH A SEALING BAND

BACKGROUND OF INVENTION

The present invention relates to improvements to a reusable storm drainage conduit plug with sealing means for preventing debris and the like from entering the conduit during storm drain construction.

During construction storm drainage conduits are laid in trenches and the work may have to be interrupted, for instance at night, or when interrupted traffic flow must continue. The open ends of the conduits must be protected from dirt and other debris.

Applicant has a number of previous inventions directed to storm drainage conduit plugs, including U.S. Pat. Nos. 5,316,045 and 5,806,566. These patents are incorporated herein by reference. The present invention is an improvement to these plugs in several ways.

It is an object of the invention to an outer panel that is generally dome-shaped to provide additional strength by tapering the upper surface to distribute the weight of soil and the like.

It is another object of the invention to provide depressions in the outer panel for labeling areas for identification means or other pertinent information.

It is another object of the invention to provide an annular groove in the sealing surface to provide means to secure a sealing band in place. This improvement allows the plug to accept a variety of sealing bands that are used in a variety of drainage conduits.

It is another object of the invention to provide a cavity formed on an inner surface of the plug, positioned medially and dimensioned to mate with a handle of a second plug for stacking.

SUMMARY OF THE INVENTION

The general purpose of the present invention, which will be described subsequently in greater detail, is to provide new and improved plug.

To attain this, the present invention comprises a plug having an outer panel and an inner panel. The plug is combined with a sealing band to install in the ends of conduits. The outer panel has a sloping surface generally dome-shaped in appearance. There is a handle disposed centrally from the outer panel.

The inner panel comprises a sealing surface and an inner wall. The sealing surface has a groove integrally formed therein to mount the sealing band. The inner wall of the inner panel has a slot defined therein oriented and centrally located to engage with the handle of a second plug for stacking.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevational view with the sealing band removed.

FIG. 6 is a side elevational view with the sealing band in the installed position.

DETAILED DESCRIPTION OF THE INVENTION

Figure 1:
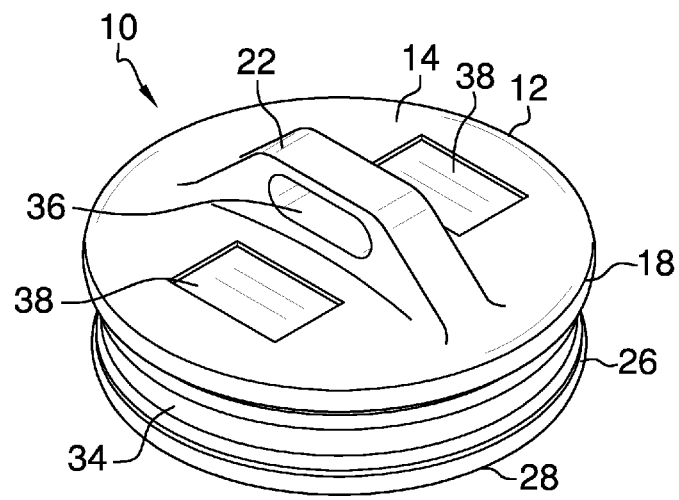
FIG. 1 is a front elevational perspective view of the present invention.
Figure 7:
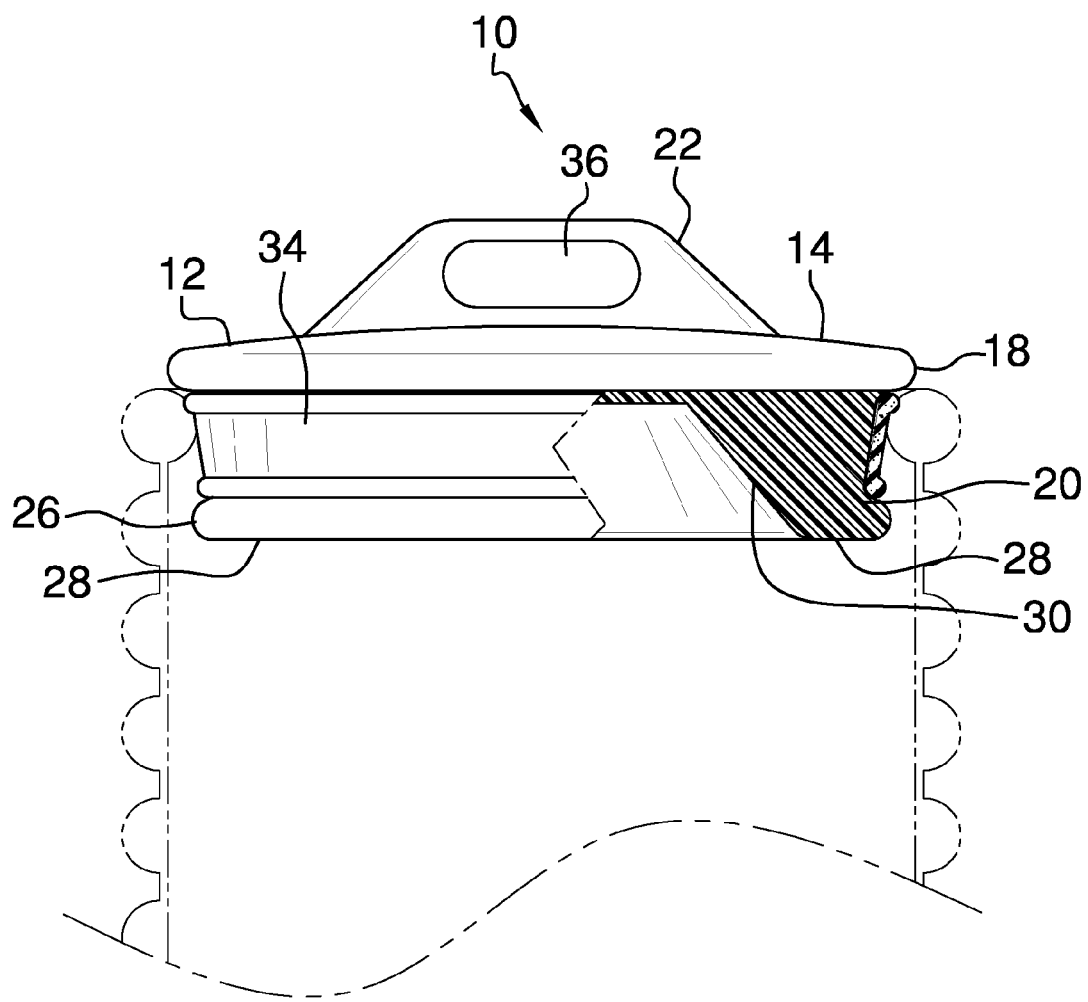
FIG. 7 is a side elevation partial section view of the invention in conjunction with a conventional storm drainage conduit in phantom.

Referring to the drawings in general and FIG. 1 in particular, an embodiment of the present invention 10 will now be described in greater detail. In FIG. 7, a conventional circular concrete drainage conduit is shown in phantom.

The device includes a thin wall plastic plug 12 formed by roto-mold techniques, or other comparable techniques, so that there are no overlapping seams, panels, edges or wall members. The plug 12 is formed of high density polyethylene. The plug is formed having an outer panel 14 and an inner panel 16. The outer panel 14 has a sloping surface generally dome-shaped in appearance. There is a handle 22 disposed centrally from the outer panel. In some embodiments the handle 22 has a passage therethrough for gripping. The outer panel 14 is tapered from the handle 22 to a circular perimeter planer surface 18 defining the outer circular perimeter of the plug 12. The tilt of the outer panel 14 distributes the weight of soil and the like when the plug 12 is covered during construction, and is an improvement over plugs having a planer upper surface without an angle of slope. It should be recognized that the elevation of the outer panel 14 is not limited to any particular angle of slope. Optionally, the plug 12 has at least one recessed indentation 38 formed therein to affixed labels or other identification material.

The circular perimeter planer surface 18 is integrally formed with the inner panel 16. The inner panel 16 comprises a downwardly depending sealing surface 20 having an annular groove 24 defined therein, an annular shaped raised portion 28 and an inner wall 30. The groove 24 is defined by a tapered back wall with an outwardly depending surface to an annular lip 26 defining the base of the groove 24. The sealing surface 20 is smaller in diameter and concentrically located with respect to the outer circular diameter of the plug 12. By this arrangement the plug 12 is hermetically sealed when mounted into a conduit.

Referring to FIGS. 5-6, a sealing band 34 is illustrated mounted in the annular groove 24 and stabilized by the lip 28. The tapered back wall of the groove 24 is approximately 1½ inches in width, the outwardly depending surface is approximately ¾ of an inch wide and the lip 28 is approximately ¾ of an inch traversely. It should be noted that these dimensions may change as needed in the industry. The sealing band 34 is formed of elastomeric material and sized in circumference to fit against the sealing surface 20. The band is not limited to any specific configuration, and comes in a variety of rib arrangements, indentations and contact surface prominences. By being snugly placed within the groove 24 and secured by the lip 28, the band will not easily disengage from the sealing surface and the plug, representing an improvement over the prior art. As an example of a band, as detailed in applicant's patent '566, the sealing band can be uniform is cross section around its entire length having radially outfacing surfaces having radially spaced resilient outwardly extending flanges of different lengths. The band can also include pointed ribs extending inwardly in spaced relation from each end of the inwardly facing surface. Because of the need for a variety of bands to mate with the inner surface of a variety of storm drainage conduits, it should be recognized that the present invention is not limited to any specific structure of band. While the plug's main use is as a temporary cover, with the proper sealing band the plug can be mounted in a permanent manner. For instance, the sealing band can have lock-tight stainless steel teeth integrally formed therein.

Figure 2:
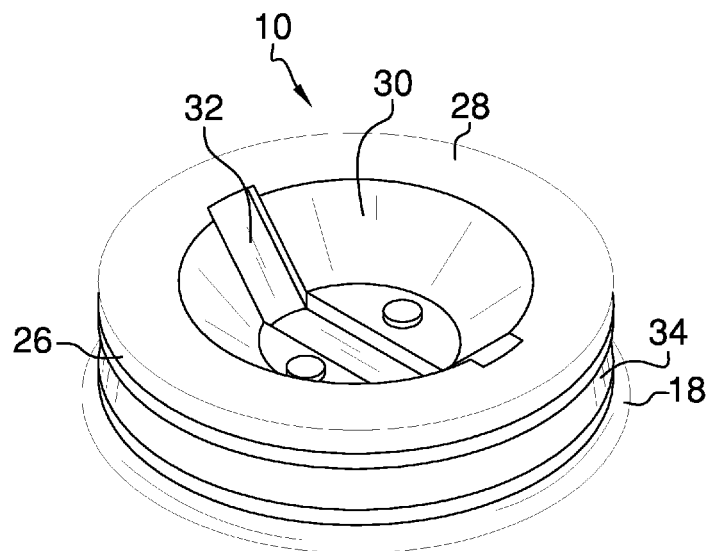
FIG. 2 is a bottom elevational perspective view of the present invention.
Figure 3:
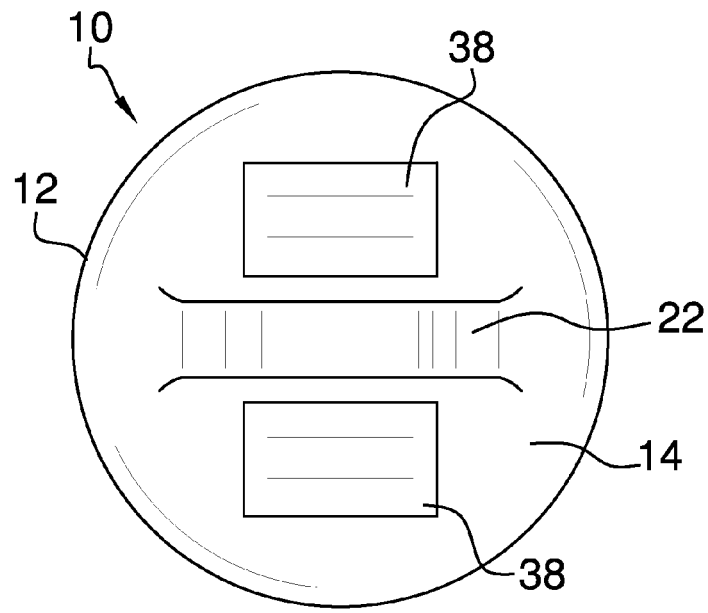
FIG. 3 is a top plan view of the present invention.
Figure 4:
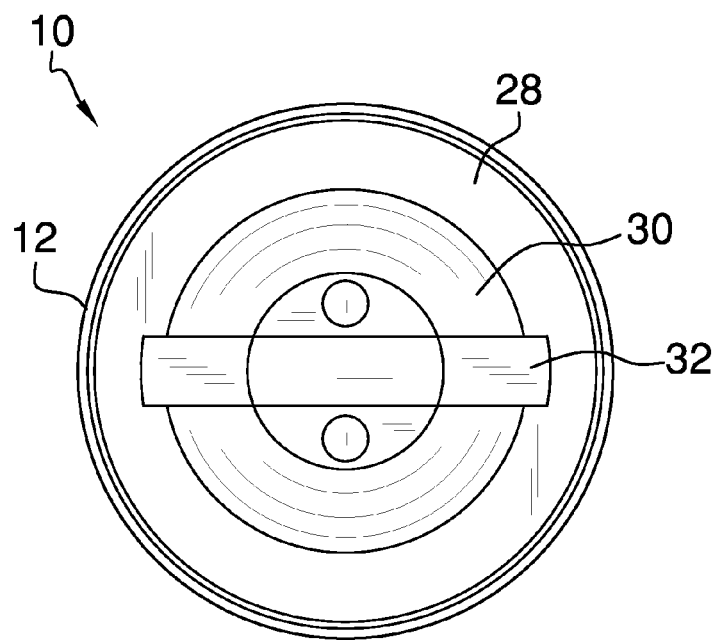
FIG. 4 is a bottom plan view of the present invention.

Referring to FIGS. 2 and 4, the inner wall 30 has a side planer surface wall and a generally flat upper wall, and has a recessed slot 32 defined therein. The slot 32 is aligned and dimensioned to engage with the handle of another plug 12 for stacking. Thus multiple plugs are available for on-site construction and the stacking feature also provides for proficient shipping.

Referring to FIG. 7, the plug 12 is shown installed in a storm drain conduit. The sealing band abuts the inner surface of the conduit preventing water, soil or debris from entering the conduit. It should be recognized that the plug 12 is not limited to use with reinforced concrete conduits for temporary placement. For instance, the sealing band can have lock-tight stainless steel teeth integrally formed therein, and the plug can become permanent in nature.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

I claim:

1. A storm drain conduit plug for use with a sealing band to temporarily close the open end of a drainage conduit, comprising:
    an outer panel having a handle extending from the central portion of the outer panel, the outer panel being integrally formed with a circular perimeter planer surface defining the outer circular perimeter of the plug, and the outer panel having at least one recessed indentation formed therein to affixed identification means;
    an inner panel extending from the circular planer surface, whereby the inner panel has a downwardly depending sealing surface having an annular groove having a tapered back wall depending downwardly defined therein for the mounting of the sealing band;
    an annular lip integrally formed at a base of the groove to prevent the sealing band from being dislodged from the plug;
    an annular shaped raised portion defining an outer portion of the sealing surface; and
    an inner wall integrally formed with the annular shaped raised portion, whereby the inner wall has a side planer surface wall and a generally flat upper wall, and has a recessed slot defined therein, the slot being aligned and dimensioned to engage with the handle of another plug for stacking.

2. The plug as set forth in claim 1, whereby the outer panel is tapered at a pre-determined elevation from the handle to the circular perimeter planer surface defining the outer circular perimeter of the plug.

3. A storm drain conduit plug for use with a sealing band to temporarily close the open end of a drainage conduit, comprising:
    an outer panel having a handle extending from the central portion of the outer panel, the outer panel being integrally formed with a circular perimeter planer surface defining the outer circular perimeter of the plug;
    an inner panel extending from the circular planer surface, whereby the inner panel has a downwardly depending sealing surface having an annular groove having a tapered back wall depending downwardly defined therein for the mounting of the sealing band;
    an annular lip integrally formed at a base of the groove to prevent the sealing band from being dislodged from the plug;
    an annular shaped raised portion defining an outer portion of the sealing surface; and
    an inner wall integrally formed with the annular shaped raised portion, whereby the inner wall has a side planer surface wall and a generally flat upper wall, and has a recessed slot defined therein, the slot being aligned and dimensioned to engage with the handle of another plug for stacking.

* * * * *